United States Patent
Eser et al.

(10) Patent No.: US 9,624,842 B2
(45) Date of Patent: Apr. 18, 2017

(54) DETERMINATION OF A VALUE FOR A VALVE LIFT OF A VALVE OF AN INDIVIDUAL CYLINDER OF AN INTERNAL COMBUSTION ENGINE WITH A PLURALITY OF CYLINDERS

(71) Applicant: CONTINENTAL AUTOMOTIVE GMBH, Hannover (DE)

(72) Inventors: Gerhard Eser, Hemau (DE); Martin Reisinger, Painten (DE); Ganizani Master, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 406 days.

(21) Appl. No.: 14/363,883

(22) PCT Filed: Dec. 5, 2012

(86) PCT No.: PCT/EP2012/074496
§ 371 (c)(1),
(2) Date: Jun. 9, 2014

(87) PCT Pub. No.: WO2013/087478
PCT Pub. Date: Jun. 20, 2013

(65) Prior Publication Data
US 2015/0152792 A1 Jun. 4, 2015

(30) Foreign Application Priority Data
Dec. 13, 2011 (DE) .................. 10 2011 088 403

(51) Int. Cl.
*F02D 13/02* (2006.01)
*F02D 41/14* (2006.01)
(Continued)

(52) U.S. Cl.
CPC ............... *F02D 13/02* (2013.01); *F01L 1/00* (2013.01); *F02D 13/0207* (2013.01);
(Continued)

(58) Field of Classification Search
CPC ............... F02D 13/02; F02D 41/0235; F02D 2041/001; F02D 13/0253; F01L 2201/00; F01L 9/025; F01L 1/26; F01L 1/026
(Continued)

(56) References Cited

U.S. PATENT DOCUMENTS 6,338,321 B1   1/2002   Denz .......................... 123/90.15
6,948,358 B2   9/2005   Weiss et al. ................ 73/114.79
(Continued)

FOREIGN PATENT DOCUMENTS

CN    1880743 A     12/2006   .............. F01L 13/00
DE    19932665 A1    1/2000   ................ F01L 1/46
(Continued)

OTHER PUBLICATIONS

Chinese Office Action, Application No. 201280061604.6, 13 pages, Dec. 22, 2015.
(Continued)

*Primary Examiner* — Hai Huynh
*Assistant Examiner* — Raza Najmuddin
(74) *Attorney, Agent, or Firm* — Slayden Grubert Beard PLLC

(57) ABSTRACT

A method and device for determining a value for a valve lift of a valve of an individual cylinder of a multi-cylinder internal combustion engine are provided. The method includes determining a first exhaust-gas lambda value for fuel combustion in the individual cylinder in a first operating state of the engine by a cylinder-individual and time-resolved detection of lambda values without an artificial variation in an air/fuel ratio. The method also includes (Continued)

determining an air mass sucked in by all cylinders of the engine in the first operating state. The method also includes determining the value for the valve lift of the valve of the individual cylinder based on the first exhaust-gas lambda value, the determined air mass, and a correction value, wherein the correction value is based on a relationship between the valve lift and an associated air mass sucked in by all cylinders of the engine.

13 Claims, 2 Drawing Sheets

(51) Int. Cl.
*F02D 41/18* (2006.01)
*F01L 1/00* (2006.01)
*F02D 41/24* (2006.01)
*F02D 41/02* (2006.01)
*F02D 41/00* (2006.01)
*F02D 13/00* (2006.01)

(52) U.S. Cl.
CPC ..... *F02D 13/0226* (2013.01); *F02D 41/0235* (2013.01); *F02D 41/1454* (2013.01); *F02D 41/18* (2013.01); *F02D 41/2464* (2013.01); *F01L 2800/00* (2013.01); *F01L 2800/09* (2013.01); *F01L 2800/11* (2013.01); *F01L 2800/14* (2013.01); *F02D 41/008* (2013.01); *F02D 2013/005* (2013.01); *F02D 2041/001* (2013.01); *Y02T 10/18* (2013.01)

(58) Field of Classification Search
USPC .................................. 123/90.1, 90.11, 90.22
See application file for complete search history.

(56) References Cited

U.S. PATENT DOCUMENTS

| | | | |
|---|---|---|---|
| 7,063,057 B1 | 6/2006 | Waters et al. | 123/90.16 |
| 7,069,142 B2 * | 6/2006 | Keller | F01L 3/24 |
| | | | 701/114 |
| 7,314,028 B2 | 1/2008 | Yasui et al. | 123/90.16 |
| 7,489,999 B2 | 2/2009 | Miyakoshi et al. | 701/103 |
| 7,676,317 B2 | 3/2010 | Aliakbarzadeh et al. | 701/103 |
| 7,703,437 B2 | 4/2010 | Scheffler et al. | 123/406.14 |
| 2005/0044934 A1 | 3/2005 | Weiss et al. | 73/114.79 |
| 2005/0204805 A1 | 9/2005 | Wakahara et al. | 73/114.72 |
| 2006/0293832 A1 | 12/2006 | Schwarzenthal et al. | 701/114 |
| 2009/0037083 A1 | 2/2009 | Scheffler et al. | 701/104 |

FOREIGN PATENT DOCUMENTS

| | | | | |
|---|---|---|---|---|
| DE | 10230899 A1 | 2/2004 | | F01L 1/46 |
| DE | 10355335 A1 | 6/2005 | | F01L 13/00 |
| DE | 102005009101 B3 | 3/2006 | | F02D 41/14 |
| DE | 102006026390 A1 | 12/2007 | | F02D 41/14 |
| DE | 102007062090 A1 | 6/2008 | | F02D 13/02 |
| EP | 1911954 A1 | 4/2008 | | F02D 41/00 |
| WO | 2006/018377 A1 | 2/2006 | | F01L 1/34 |
| WO | 2013/087478 A1 | 6/2013 | | F01L 1/00 |

OTHER PUBLICATIONS

International Search Report and Written Opinion, Application No. PCT/EP2012/074496, 19 pages, Feb. 28, 2013.

* cited by examiner

DETERMINATION OF A VALUE FOR A VALVE LIFT OF A VALVE OF AN INDIVIDUAL CYLINDER OF AN INTERNAL COMBUSTION ENGINE WITH A PLURALITY OF CYLINDERS

CROSS-REFERENCE TO RELATED APPLICATIONS

This application is a U.S. National Stage Application of International Application No. PCT/EP2012/074496 filed Dec. 5, 2012, which designates the United States of America, and claims priority to DE Application No. 10 2011 088 403.3 filed Dec. 13, 2011, the contents of which are hereby incorporated by reference in their entirety.

TECHNICAL FIELD

The invention relates to a method for determining a value for a valve lift of a valve of an individual cylinder of an internal combustion engine with a plurality of cylinders. The invention also relates to a device for determining a value for a valve lift of a valve of an individual cylinder of an internal combustion engine with a plurality of cylinders. The invention also relates to an engine controller for a vehicle having an internal combustion engine and to a computer program for controlling an internal combustion engine.

BACKGROUND

In order to reduce further the fuel consumption and the emissions of pollutants of modern internal combustion engines, internal combustion engines are being increasingly used which have a variable valve lift system for variable control of the lift of the inlet valves and/or of the outlet valves. In these systems, load control without throttling by means of a throttle valve is possible over a large operating range of the internal combustion engine since the load control takes place by means of the lift of the inlet valves. In particular, internal combustion engines with a variable valve lift system can be operated virtually unthrottled in a lower and central load range, i.e. the throttle valve is fully opened. In this unthrottled operating range, for example losses due to load changes are low, which can bring about reduced consumption of the internal combustion engine.

Fabrication-related deviations and tolerances in a valve train and in the valves can lead to errors during the filling of the cylinders. In particular, in the lower load range and in the idling mode, where the lifts of the inlet valves are very small in the unthrottled operating mode, even small errors during the filling of the cylinders can result as perceptible differences in torque which limits driving comfort. These differences in torque, which can occur not only between different internal combustion engines but also between the cylinders of the same internal combustion engine, lead in the worst case to perceptible unsmooth running in the lower load range or in the idling mode and therefore limit the driving comfort. In addition, errors during the filling of a cylinder, owing to tolerances in the valve lift, can affect the lambda values of the individual cylinders of the internal combustion engine.

EP 1 193 381 A2 discloses a control unit for controlling an internal combustion engine with a variably controllable valve lift and with a throttle valve in the intake section. The control unit has means which monitor the unsmooth running of the internal combustion engine and which, in the event of a defined unsmooth running threshold value being exceeded and in the case of a valve lift which is smaller than a predefined threshold, activate the throttle valve in the closing direction until the unsmooth running threshold value is undershot again.

In addition, various methods for compensating cylinder-specific differences in the lambda value are known from the prior art. For example, DE 10 2005 009 101 B3 describes a method for determining a correction value for influencing an air/fuel ratio in a respective cylinder of an internal combustion engine with a plurality of cylinders. The cylinders are assigned injection valves which meter fuel. An exhaust gas probe supplies a measurement signal which is characteristic of the air/fuel ratio in the respective cylinder. The measurement signal is detected at a predefined sampling crankshaft angle with respect to a reference position of the piston of the respective cylinder and is assigned to the respective cylinder. By means of one controller in each case, a controller value for influencing the air/fuel ratio in the respective cylinder is obtained as a function of the measurement signal which is detected for the respective cylinder.

Document DE 10 2006 026 390 A1 describes an electronic control device for controlling an internal combustion engine in a motor vehicle with an unsmooth running determining unit and with an injection quantity correction unit, wherein a defined group of cylinders is assigned to a lambda probe. The control device is characterized in that the injection quantity correction unit is configured in such a way that the injection quantity of a cylinder, which is to be examined, of the defined group can be adjusted in the lean direction by a difference adjustment value which is assigned to an unsmooth running difference value, and the injection quantity of at least one of the other cylinders which are assigned to the same lambda probe can be correspondingly adjusted in the enriched direction, with the result that overall a predefined lambda value of this group, preferably a lambda value of at least approximately 1, is achieved. In addition, the control device is characterized in that in this way a cylinder-specific difference adjustment value can be set for each cylinder of the defined group, and in that cylinder-specific correction values can be determined by forming a ratio between the cylinder-specific difference adjustment values.

WO 2006/018377 discloses a method for controlling an internal combustion engine. The internal combustion engine has a camshaft which acts on gas exchange valves, a phase adjustment device by means of which a phase between the camshaft and a crankshaft can be adjusted, an exhaust gas probe by means of which a variable which characterizes an air/fuel ratio in a cylinder is detected, at least one sensor for detecting the phase and at least one actuating element which acts on the internal combustion engine. In the method, measurement data sets are determined which are assigned to various detected phases and which comprise, in addition to the detected phase, at least the detected variable which characterizes the air/fuel ratio in the cylinder. In addition, an optimization method is carried out by means of which a correction value for the detected phase is obtained as a function of the measurement data sets, specifically in such a way that a quality function is minimized or maximized, said quality function depending on the variables assigned to the measurement data sets. In addition, in the method at least one actuation variable for controlling an actuating element is determined during the further operation of the internal combustion engine, as a function of the detected phase which is corrected by means of the correction value.

SUMMARY

One embodiment provides a method for determining a value for a valve lift of a valve of an individual cylinder of an internal combustion engine with a plurality of cylinders, the method comprising: determining a first exhaust gas lambda value for fuel combustion in the individual cylinder in a first operating state of the internal combustion engine, wherein the first exhaust gas lambda value is determined without artificial variation of an air/fuel ratio by means of cylinder-specific and time-resolved detection of lambda values, wherein in each case a lambda value is correlated with combustion processes in the one respective cylinder of the internal combustion engine, determining an air mass which is sucked in by all the cylinders of the internal combustion engine in the first operating state, and obtaining the value for the valve lift of the valve of the individual cylinder on the basis of the first exhaust gas lambda value, the determined air mass and a correction value, wherein the correction value is based on a relationship between the valve lift and an associated air mass which is sucked in by all the cylinders of the internal combustion engine.

In a further embodiment, the method also comprises determining a second exhaust gas lambda value for fuel combustion in the individual cylinder in a second operating state of the internal combustion engine, wherein the second exhaust gas lambda value is determined without artificial variation of an air/fuel ratio by means of cylinder-specific and time-resolved detection of lambda values, wherein in each case a lambda value is correlated with combustion processes in the one respective cylinder of the internal combustion engine, and wherein the value for the valve lift of the valve of the individual cylinder is additionally obtained on the basis of the second exhaust gas lambda value.

In a further embodiment, the value for the valve lift in the second operating state is greater than the value for the valve lift in the first operating state.

In a further embodiment, the first operating state of the internal combustion engine is selected in such a way that an error in a fuel supply into the individual cylinder has a smaller influence on the exhaust gas lambda value which is determined on a cylinder-specific basis than an error in a fresh air supply into the individual cylinder, and the second operating state of the internal combustion engine is selected in such a way that an error in the fuel supply into the individual cylinder has a greater influence on the exhaust gas lambda value which is determined on a cylinder-specific basis than an error in the fresh air supply into the individual cylinder.

In a further embodiment, the value for the valve lift of the valve of the individual cylinder is obtained on the basis of a deviation of the exhaust gas lambda value for fuel combustion in the individual cylinder from a predefined exhaust gas lambda value.

In a further embodiment, cylinder-specific errors in the fuel supply are taken into account during the determination of the deviation of the exhaust gas lambda value.

In a further embodiment, the method is carried out only when predefined conditions with respect to stability of the first operating state and/or of the second operating state are satisfied.

In a further embodiment, the method also comprises calculating the correction value by forming a ratio between a change in the valve lift and a resulting change in the air mass which is sucked in by all the cylinders of the internal combustion engine in the first operating state.

Another embodiment provides a method for controlling a valve lift of a valve of an individual cylinder of an internal combustion engine with a plurality of cylinders, the method comprising determining a value for the valve lift by a method as disclosed above, and controlling the valve lift on the basis of the determined value for the valve lift.

In a further embodiment, a setpoint value for a minimum value for the valve lift is adapted on the basis of the determined value for the valve lift.

Another embodiment provides a device for determining a value for a valve lift of a valve of an individual cylinder of an internal combustion engine with a plurality of cylinders, wherein the device has a determining unit for (i) determining a first exhaust gas lambda value for fuel combustion in the individual cylinder in a first operating state of the internal combustion engine, wherein the first exhaust gas lambda value is determined without artificial variation of an air/fuel ratio by means of cylinder-specific and time-resolved detection of lambda values, wherein in each case a lambda value is correlated with combustion processes in the one respective cylinder of the internal combustion engine, and (ii) determining an air mass which is sucked in by all the cylinders of the internal combustion engine in the first operating state, and an evaluation unit for obtaining the value for the valve lift of the valve of the individual cylinder on the basis of the first exhaust gas lambda value, the determined air mass and a correction value, wherein the correction value is based on a relationship between the valve lift and an associated air mass which is sucked in by all the cylinders of the internal combustion engine.

Another embodiment provides an engine controller for a vehicle having an internal combustion engine, wherein the engine controller is configured to carry out a method as disclosed above for determining a value for a valve lift of a valve of an individual cylinder of an internal combustion engine with a plurality of cylinders and/or the method disclosed above for controlling a valve lift of a valve of an individual cylinder of an internal combustion engine with a plurality of cylinders.

Another embodiment provides a computer program for controlling an internal combustion engine, wherein the computer program is configured, when executed by a processor, to carry out the method as disclosed above for determining a value for a valve lift of a valve of an individual cylinder of an internal combustion engine with a plurality of cylinders and/or the method as disclosed above for controlling a valve lift of a valve of an individual cylinder of an internal combustion engine with a plurality of cylinders.

BRIEF DESCRIPTION OF THE DRAWINGS

Example embodiments of the invention are discussed below with reference to the drawings, in which.

DETAILED DESCRIPTION

Figure 1:
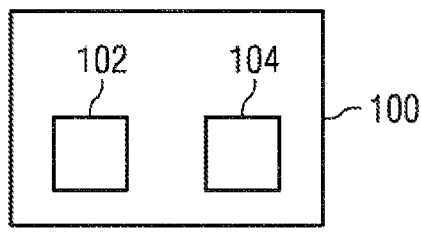
FIG. 1 shows an embodiment of a device for determining a value for a valve lift.

Embodiments of the invention are directed to improving operation of an internal combustion engine.

According to a first aspect, a method for determining a value for a valve lift of a valve of an individual cylinder of an internal combustion engine with a plurality of cylinders is described. The method comprises determining a first exhaust gas lambda value for fuel combustion in the individual cylinder in a first operating state of the internal combustion engine, wherein the first exhaust gas lambda value is determined without artificial variation of an air/fuel ratio by means of cylinder-specific and time-resolved detection of lambda values. During the cylinder-specific and time-resolved detection of lambda values, in each case a lambda value is correlated with combustion processes in the one respective cylinder of the internal combustion engine. The method also comprises determining an air mass which is sucked in by all the cylinders of the internal combustion engine in the first operating state. Furthermore, the method comprises obtaining the value for the valve lift of the valve of the individual cylinder on the basis of the first exhaust gas lambda value, the determined air mass and a correction value, wherein the correction value is based on a relationship between the valve lift and an associated air mass which is sucked in by all the cylinders of the internal combustion engine.

In particular, the internal combustion engine can be an internal combustion engine with a variable valve lift system for variable control of lift of a valve. In a variable valve lift system, the lift of a valve of an individual cylinder can be set individually. For example, a variable valve lift system can be used to permit load control of the internal combustion engine without throttling by means of a throttle valve. In such a case, the load control of the internal combustion engine can be carried out by means of the lift of a valve.

The term "valve" can be understood to mean here, in particular, a valve whose lift can be set individually. For example, such a valve can be used to allow fresh air to flow into an individual cylinder of an internal combustion engine with a plurality of cylinders. A valve can be, for example, a cylinder inlet valve. In addition, the valve can be a cylinder outlet valve.

In particular, an exhaust gas lambda value can be indicative of an air/fuel ratio in the internal combustion engine, i.e. in all the combustion chambers or cylinders of the internal combustion engine. In addition, the exhaust gas lambda value can be indicative of the air/fuel ratio in an individual cylinder of the internal combustion engine. For example, the exhaust gas lambda value can be dependent on the lift of a valve of the individual cylinder. In particular, the exhaust gas lambda value can be determined in an individual cylinder. For example, the exhaust gas lambda value can be detected by means of a lambda probe.

The term "without artificial variation of an air/fuel ratio" can be understood here to mean, in particular, that the exhaust gas lambda value of an individual cylinder is not determined by means of a method in which the exhaust gas lambda value of the individual cylinder is determined by means of selective variation of an air/fuel ratio in an individual cylinder.

The term "time-resolved" can be understood to mean, in particular, that a measured exhaust gas lambda value is determined as a function of the time. In particular, time-resolved can mean that a measured exhaust gas lambda value is determined as a function of an operating cycle of the internal combustion engine. In addition, time-resolved can mean that an associated exhaust gas lambda value can be assigned to an individual cylinder of the internal combustion engine.

The term "operating state of the internal combustion engine" can be understood as meaning, in particular, a load range of the internal combustion engine. The latter can be determined, for example, on the basis of a rotational speed, a valve lift etc. In addition, a temperature, in particular a temperature of a coolant, can also be a parameter for determining an operating state of the internal combustion engine.

In particular, when determining the first exhaust gas lambda value without artificial variation of an air/fuel ratio by means of cylinder-specific and time-resolved detection of lambda values it is possible to dispense with determining an unsmooth running value of the internal combustion engine.

The term "air mass" can be understood to mean, in particular, an air mass which is sucked in by all the cylinders of the internal combustion engine. In particular, this can be understood as meaning an average air mass per cylinder. In addition, the term "air mass" can be understood to mean an air mass which is sucked in by the cylinder per operating cycle or per lift of the respective cylinder.

In particular, the relationship between a value for the valve lift and an associated air mass which is sucked in by all the cylinders of the internal combustion engine can be given by means of a function which describes a dependence of the sucked-in air mass on valve lift. In addition, the relationship can also be given by means of a function which describes the valve lift as a function of the sucked-in air mass.

For example, the relationship between the value for the valve lift and an associated air mass which is sucked in by all the cylinders of the internal combustion engine can be determined by means of an engine test bench and/or test setup. In particular, the relationship between the value for the valve lift and an associated air mass which is sucked in by all the cylinders of the internal combustion engine can be dependent on the type of the internal combustion engine and/or on the type of the valves and/or on the type of the cylinders.

According to a further aspect, a device for determining a value for a valve lift of a valve of an individual cylinder of an internal combustion engine with a plurality of cylinders is described. The device has a determining unit (i) for determining a first exhaust gas lambda value for fuel combustion in the individual cylinder in a first operating state of the internal combustion engine, wherein the first exhaust gas lambda value is determined without artificial variation of an air/fuel ratio by means of cylinder-specific and time-resolved detection of lambda values, wherein in each case a lambda value is correlated with combustion processes in the one respective cylinder of the internal combustion engine, and (ii) for determining an air mass which is sucked in by all the cylinders of the internal combustion engine in the first operating state. In addition, the device has an evaluation unit for obtaining the value for the valve lift of the valve of the individual cylinder on the basis of the first exhaust gas lambda value, the determined air mass and a correction value, wherein the correction value is based on a relationship between the valve lift and an associated air mass which is sucked in by all the cylinders of the internal combustion engine.

In an internal combustion engine with a variable valve lift system, in particular a fresh air supply into an individual cylinder of the internal combustion engine can be dependent on a value for the valve lift of the individual cylinder. A change in the fresh air supply into an individual cylinder can influence, in particular, an exhaust gas lambda value, i.e. an air/fuel ratio, of the individual cylinder. If an exhaust gas lambda value of an individual cylinder of the internal combustion engine is then preferably determined without artificial variation of an air/fuel ratio by means of cylinder-specific and time-resolved detection of lambda values, a variable which is proportional to the value for the valve lift of the individual cylinder of the internal combustion engine can be determined on the basis of the exhaust gas lambda value and a determined air mass which is sucked in by all the cylinders of the internal combustion engine.

An advantage of the method can be in particular that it is possible to dispense with determining unsmooth running of the internal combustion engine in order to obtain an exhaust gas lambda value of the individual cylinder. As a result, the determination of a value for a valve lift of an individual cylinder of the internal combustion engine can be simplified. In addition, it can be an advantage of the method that an exhaust gas lambda value is determined without artificial variation of an air/fuel ratio. A further advantage can be that measures for emergency running of the internal combustion engine are facilitated by means of a specific value for the valve lift.

According to one embodiment, the method comprises determining a second exhaust gas lambda value for fuel combustion in the individual cylinder in a second operating state of the internal combustion engine, wherein the second exhaust gas lambda value is determined without artificial variation of an air/fuel ratio by means of cylinder-specific and time-resolved detection of lambda values. During the cylinder-specific and time-resolved detection of lambda values, in each case a lambda value is correlated with combustion processes in the one respective cylinder of the internal combustion engine. In addition, the value for the valve lift of the valve of the individual cylinder is additionally obtained on the basis of the second exhaust gas lambda value.

In particular, the value for the valve lift of the valve of the individual cylinder can possibly be determined more precisely if the value for the valve lift is additionally determined on the basis of the second exhaust gas lambda value.

According to a further embodiment, the second operating state is characterized in that the value for the valve lift in the second operating state is greater than the value for the valve lift in the first operating state.

In particular, when there is a relatively large value for the valve lift an influence of a fabrication-related deviation of a valve train and/or at the valve can be smaller.

According to a further embodiment, the first operating state of the internal combustion engine is selected in such a way that an error in a fuel supply into the individual cylinder has a smaller influence on the exhaust gas lambda value which is determined on a cylinder-specific basis than an error in a fresh air supply into the individual cylinder. In addition, the second operating state of the internal combustion engine is selected in such a way that an error in the fuel supply into the individual cylinder has a greater influence on the exhaust gas lambda value which is determined on a cylinder-specific basis than an error in the fresh air supply into the individual cylinder.

In particular, an exhaust gas lambda value of an individual cylinder can be dependent on an error in the fuel supply into the cylinder and on an error in the fresh air supply into the cylinder. For example, in the case of a high value for a valve lift the errors in the fuel supply can dominate the exhaust gas lambda value. In this case, dominance of a fuel path is also said to occur. In contrast, in the case of a small value for the valve lift the exhaust gas lambda value can be dominated by an error in the fresh air supply. In this case, dominance of an air path is said to occur. It may be an advantage, in particular, that in this way an influence of an error in the fuel supply, for example an error in fuel injection, on the exhaust gas lambda value can be obtained and compensated.

If an exhaust gas lambda value in the individual cylinder is determined without artificial variation of an air/fuel ratio by means of cylinder-specific and time-resolved detection of lambda values, a further advantage can be that it is possible to distinguish more easily between influence of a fuel supply error and influence of a fresh air supply error.

According to a further embodiment, the value for the valve lift of the valve of the individual cylinder is obtained on the basis of a deviation of the exhaust gas lambda value for fuel combustion in the individual cylinder from a predefined exhaust gas lambda value.

In particular, a deviation of the exhaust gas lambda value for combustion of the fuel in the individual cylinder from a predefined exhaust gas lambda value can be obtained more easily than an absolute exhaust gas lambda value.

According to a further embodiment, cylinder-specific errors in the fuel supply are taken into account during the determination of the deviation of the exhaust gas lambda value.

In particular, as a result a value for the valve lift can be determined independently of an error in the fuel supply. For example, a cylinder-specific error in the fuel supply can be obtained in the second operating state which is selected in such a way that an error in the fuel supply into the individual cylinder has a relatively large influence on the exhaust gas lambda value which is determined on a cylinder-specific basis.

According to a further embodiment, the method is carried out only when predefined conditions with respect to stability of the first operating state and/or of the second operating state are satisfied.

For example, a predefined condition with respect to the stability of the operating state can be stability of a rotational speed of the internal combustion engine. In particular, it may be advantageous to carry out the method only in the case of stability of the operating state, since in this way it is possible to prevent further effects falsifying a determined exhaust gas lambda value.

According to a further embodiment, the method also comprises calculating the correction value by forming a ratio between (a) a change in the valve lift and (b) a resulting change in the air mass which is sucked in by all the cylinders of the internal combustion engine in the first operating state.

In particular, the correction value can be stored in a characteristic diagram. In addition, it can be an advantage that a ratio between the change in the valve lift and the resulting change in the air mass which is sucked in by all the cylinders of the internal combustion engine can be easily determined.

According to a further aspect, a method for controlling a valve lift of a valve of an individual cylinder of an internal combustion engine with a plurality of cylinders is described. The method comprises determining a value for the valve lift by means of a method according to the method described above. In addition, the method comprises controlling the valve lift on the basis of the determined value for the valve lift.

For example, in the case of internal combustion engines with the variable valve lift system load control can take place only by means of the lift of the inlet valves. In particular, in this way the internal combustion engine can be operated virtually unthrottled, i.e. the throttle valve is completely opened, in a lower load range and central load range.

In this unthrottled operating range, for example losses due to load changes are low, which can lead to reduced consumption of the internal combustion engine. In particular, it can be advantageous that load control of an internal combustion engine can be improved.

According to a further embodiment, a setpoint value for a minimum value for the valve lift is adapted on the basis of the determined value for the valve lift.

In order to compensate fabrication-related deviations in a valve train, while a valve lift is being controlled by means of a setpoint value for a minimum value for the valve lift it is ensured that a valve of an individual cylinder is opened and fresh air is fed into the individual cylinder. For example, owing to a fabrication-related deviation in a valve train a valve can be opened to a lesser extent than is required by the control of the internal combustion engine. This can lead to deviations in an air/fuel ratio in the individual cylinder. It may be an advantage, in particular, to adapt the setpoint value for the minimum value for the valve lift on the basis of the determined value for the valve lift. In addition, it can be advantageous if the setpoint value is adjusted from an excessively high first setpoint value for a minimum value for the valve lift in the direction of a relatively small setpoint value.

In particular, the accuracy of the adapted minimum value for the valve lift can be increased by repeating the method several times. For example, the method can be repeated after a specific event occurs. In particular, adaptation of the setpoint value for a minimum value for the valve lift can be repeated after a threshold value for the determined value for the valve lift is exceeded or undershot.

In addition, by means of a comparison with maximum and/or minimum possible fabrication-related deviations it is possible to carry out plausibility checking of the adapted minimum value for the valve lift. In addition, the method can also be used in combination with another method for determining a value for a valve lift, in order to increase the redundancy. Adaptation of the setpoint value for the minimum value for the valve lift can also be decoupled from the determination of an air/fuel ratio.

According to a further aspect, an engine controller for a vehicle having an internal combustion engine is described, wherein the engine controller is configured to carry out the abovementioned method for determining a value for a valve lift of a valve of an individual cylinder of an internal combustion engine with a plurality of cylinders and/or the method for controlling a valve lift of a valve of an individual cylinder of an internal combustion engine with a plurality of cylinders.

According to a further aspect, a computer program for controlling an internal combustion engine is described, wherein the computer program is configured, when executed by a processor, to carry out the abovementioned method for determining a value for a valve lift of a valve of an individual cylinder of an internal combustion engine with a plurality of cylinders and/or the abovementioned method for controlling a valve lift of a valve of an individual cylinder of an internal combustion engine with a plurality of cylinders.

According to this document, the designation of such a computer program is equivalent to the term of a program element, a computer program product and/or a computer-readable medium which contains instructions for controlling a computer system in order to coordinate the method of operation of a system or of a method in a suitable way in order to achieve the effects linked with the disclosed method.

The computer program can be implemented as a computer-readable instruction code in any suitable programming language such as, for example, in JAVA, C++ etc. The computer program can be stored on a computer-readable storage medium (CD-ROM, DVD, Blu-ray disc, a removable drive, volatile or nonvolatile memory, built-in memory/processor etc.). The instruction code can program a computer or other programmable devices such as, in particular, a control device for an internal combustion engine in such a way that the desired functions are executed. In addition, the computer program can be made available in a network such as, for example, the Internet, from which it can be downloaded by a user when necessary.

The invention can be implemented by means of a computer program, i.e. software, stored in a tangible memory device, as well as by means of one or more specific electronic circuits, i.e. using hardware or any desired hybrid form, i.e. by means of software components and hardware components.

It is to be noted that embodiments of the invention have been described with respect to different inventive subject matters. However, on reading this application it will become immediately clear to a person skilled in the art that unless explicitly stated otherwise both a combination of features which are associated with one type of inventive subject matter as well as any desired combination of features which are associated with different types of inventive subject matters are possible.

In addition it is to be noted that the embodiments described above constitute merely a limited selection of possible embodiment variants of the invention. In particular it is possible to combine the features of individual embodiments with one another in a suitable way, with the result that with the embodiment variants illustrated explicitly here, a multiplicity of various embodiments are to be considered as being disclosed as obvious for a person skilled in the art.

FIG. 1 shows a device 100 for determining a value for a valve lift of a valve of an individual cylinder of an internal combustion engine with a plurality of cylinders. The device has a determining unit 102 for determining a first exhaust gas lambda value for combustion of fuel in the individual cylinder in a first operating state of the internal combustion engine, wherein the first exhaust gas lambda value is determined without artificial variation of an air/fuel ratio by means of cylinder-specific and time-resolved detection of lambda values. During the cylinder-specific and time-resolved detection of lambda values, in each case a lambda value is correlated with combustion processes in the one respective cylinder of the internal combustion engine. In addition, the determining unit 102 of the device 100 determines an air mass which is sucked in by all the cylinders of the internal combustion engine in the first operating state. Furthermore, the device 100 has an evaluation unit 104 for obtaining the value for the valve lift of the valve of the individual cylinder on the basis of the first exhaust gas lambda value, the determined air mass and a correction value, wherein the correction value is based on a relationship between the valve lift and an associated air mass which is sucked in by all the cylinders of the internal combustion engine.

Figure 2:
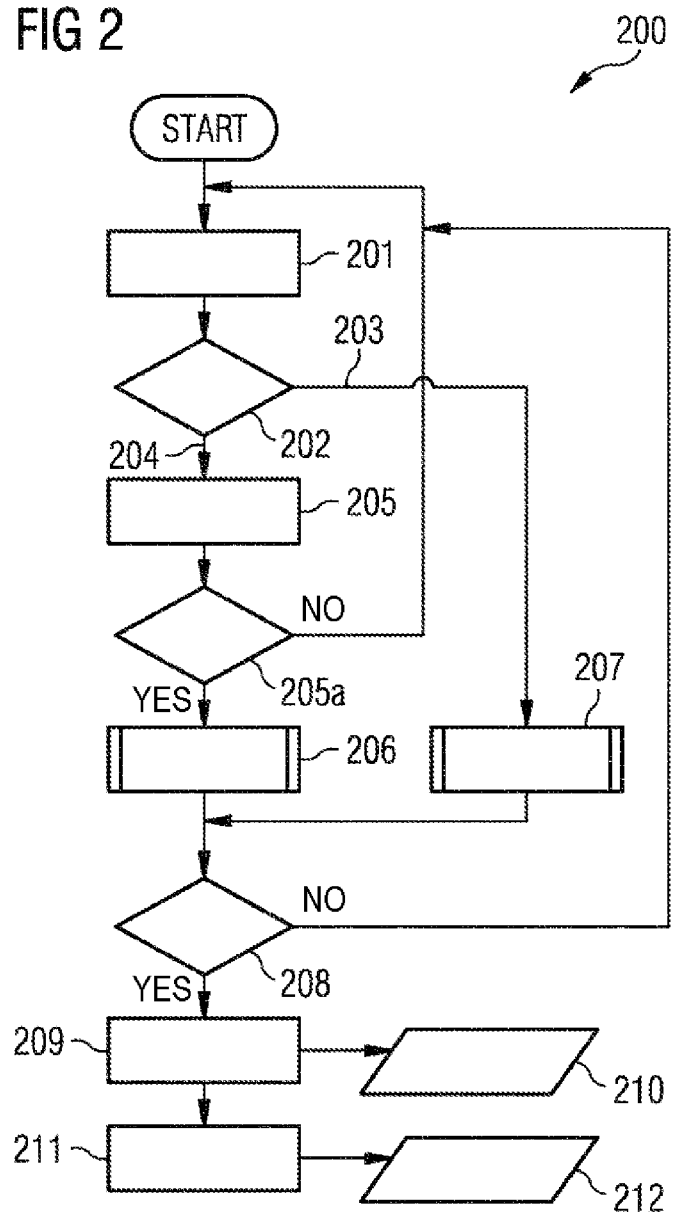
FIG. 2 shows an embodiment of a method for determining a value for the valve lift.

FIG. 2 shows an embodiment of a method 200 for determining a value for a valve lift of a valve of an individual cylinder of an internal combustion engine with a plurality of cylinders. In a first step 201, the operating state which the internal combustion engine is in is checked. If it is detected in a step 202 that the internal combustion engine is in a first operating state 203, a first exhaust gas lambda value for combustion of the fuel in the individual cylinder is determined in a step 207, wherein the first exhaust gas lambda value is determined without artificial variation of an air/fuel ratio by means of cylinder-specific and time-resolved detection of lambda values. During the cylinder-specific and time-resolved detection of lambda values, in each case a lambda value is correlated with combustion processes in the one respective cylinder of the internal combustion engine. In addition, in the step 207 an air mass which is sucked in by all the cylinders of the internal combustion engine in the first operating state is determined.

If it is detected in the step 202 that the internal combustion engine is in a second operating state 204, in a step 205 it is subsequently checked whether the second operating state 204 satisfies predefined conditions with respect to stability of the operating state. If it is detected in a step 205a that the second operating state 204 does not satisfy the predefined conditions, the method is aborted and started again. If it is detected in the step 205a that the second operating state 204 satisfies the predefined conditions, in a step 206 a second exhaust gas lambda value for combustion of the fuel in the individual cylinder is determined, wherein the second exhaust gas lambda value is also determined without artificial variation of an air/fuel ratio by means of cylinder-specific and time-resolved detection of lambda values.

In a step 208 it is checked whether the first exhaust gas lambda value and the second exhaust gas lambda value have been determined. If it is detected in the step 208 that the two exhaust gas lambda values have not been determined, the method is aborted and started again. If it is detected in the step 208 that both exhaust gas lambda values have been determined, in a step 209 a deviation of an exhaust gas lambda value for combustion of the fuel in the individual cylinder from a predefined exhaust gas lambda value is obtained, wherein, in particular, cylinder-specific errors in the fuel supply are taken into account. The errors in the fuel supply can be determined, for example, from the second exhaust gas lambda value. The deviation which is obtained for the cylinder-specific exhaust gas lambda value from a predefined value is stored in a memory in a step 210.

Finally, in a step 211 the value for the valve lift of the valve of the individual cylinder is obtained on the basis of the stored deviation, the determined air mass and a correction value. The correction value is based on a relationship between the valve lift and an associated air mass which is sucked in by all the cylinders of the internal combustion engine. The value which is obtained for the valve lift is stored in the memory in a step 212.

Figure 3:
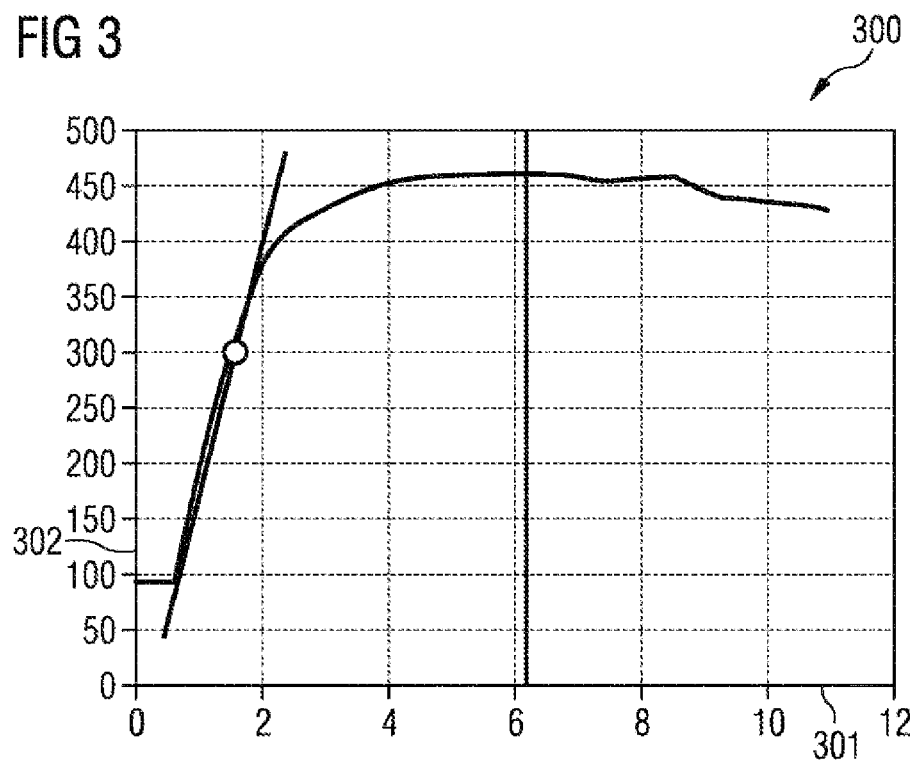
FIG. 3 shows a relationship between the valve lift and an associated air mass which is sucked in by all the cylinders of the internal combustion engine.

FIG. 3 shows a relationship 300 between the valve lift and an associated air mass which is sucked in by all the cylinders of the internal combustion engine. The value for the valve lift is plotted in millimeters on the abscissa 301.

The ordinate 302 shows an associated sucked-in average air mass in milligrams per lift. In particular, the sucked-in air mass exhibits a virtually linear dependence on a value for the valve lift at small values for the valve lift. For example, a deviation of a value for the valve lift from a predefined value for the valve lift can be determined using the following formula (1):

$$\Delta VLFT_{Zyl} = \frac{dVLFT}{dMAF} \bigg|_{MAF \cdot MAF \cdot \Delta \lambda_{Zyl}} \quad (1)$$

Here, $\Delta VLFT_{Zyl}$ is the cylinder-specific deviation of a value for the valve lift from a predefined value for the valve, $$\frac{dVLFT}{dMAF} \bigg|_{MAF}$$

is a change in the value for the valve lift as a ratio with a change of the sucked-in air mass for the respectively determined air mass, MAF is the value of the determined air mass and $\Delta \lambda_{Zyl}$ is the deviation of the exhaust gas lambda value of the individual cylinder from a predefined value for the exhaust gas lambda value.

Figure 4:
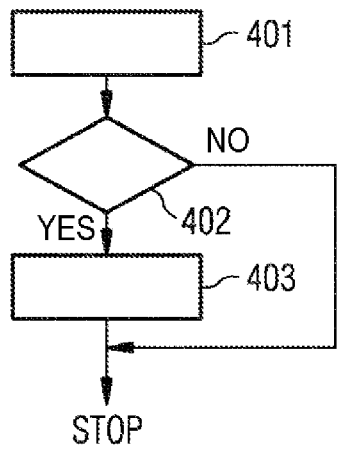
FIG. 4 shows an embodiment of a method for adapting a setpoint value for a minimum value for the valve lift.

FIG. 4 shows an embodiment of a method for adapting a setpoint value for a minimum value for the valve lift. In a step 401, a deviation from a predefined value for the valve lift is determined on the basis of the value for the valve lift which is stored in step 212. In a step 402 it is checked whether the determined deviation of the value for the valve lift is greater than a predefined deviation. If the deviation is smaller, the setpoint value for a minimum value for the valve lift is not adapted. If the deviation is greater, in a step 403 the setpoint value for a minimum value for the valve lift is adapted on the basis of the determined value for the valve lift.

Figure 5:
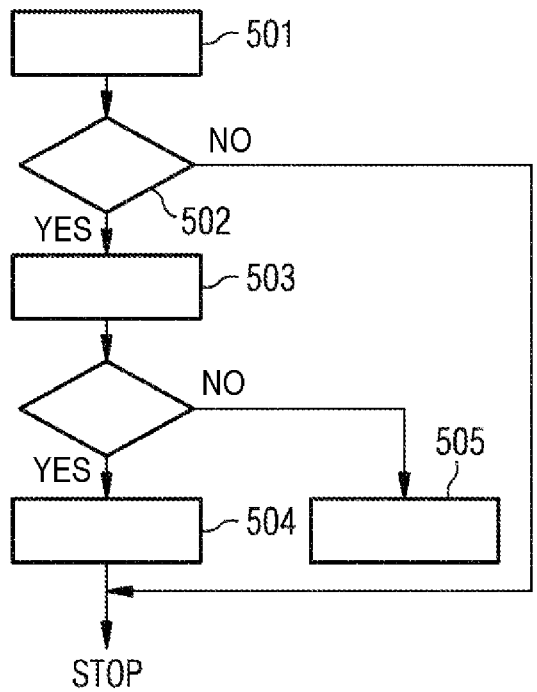
FIG. 5 shows a further embodiment of a method for adapting a setpoint value for a minimum value for the valve lift.

FIG. 5 shows a further embodiment of a method for adapting a setpoint value for a minimum value for the valve lift. In a step 501, a deviation from a predefined value for the valve lift is determined on the basis of the value, stored in step 212, for the valve lift. In a step 502 it is checked whether the determined deviation of the value for the valve lift is within a predefined interval. If the deviation is outside the predefined interval the method is aborted. If the deviation is within the predefined interval, in a step 503 it is checked whether the determined deviation is greater than a predefined deviation. If the deviation is smaller, the setpoint value for a minimum value for the valve lift is reduced in a step 505. If the deviation is greater, in a step 504 the setpoint value for a minimum value for the valve lift is increased.

In addition, it is to be noted that "having" does not exclude other elements or steps and "a" or "an" does not exclude a plurality.

LIST OF REFERENCE SYMBOLS

100 Device
102 Determining unit
104 Evaluation unit
300 Relationship between the valve lift and an associated air mass
301 Abscissa
302 Ordinate

What is claimed is:
1. A method for controlling a valve lift of a valve of an individual cylinder of an internal combustion engine with a plurality of cylinders, the method comprising:
  determining a first exhaust gas lambda value for fuel combustion in the individual cylinder in a first operating state of the internal combustion engine,
  wherein the first exhaust gas lambda value is determined without artificial variation of an air/fuel ratio by cylinder-specific and time-resolved detection of lambda values, wherein for each cylinder, a lambda value is correlated with combustion processes in that cylinder,
  determining an air mass that is sucked in by all cylinders of the internal combustion engine in the first operating state, obtaining the value for the valve lift of the valve of the individual cylinder based on the first exhaust gas lambda value, the determined air mass and a correction value, wherein the correction value is based on a relationship between the valve lift and an associated air mass that is sucked in by all the cylinders of the internal combustion engine, and adjusting a setpoint for the valve lift based on the value obtained for the valve lift.

2. The method of claim 1, further comprising:

determining a second exhaust gas lambda value for fuel combustion in the individual cylinder in a second operating state of the internal combustion engine, wherein the second exhaust gas lambda value is determined without artificial variation of an air/fuel ratio by cylinder-specific and time-resolved detection of lambda values, wherein for each cylinder, a lambda value is correlated with combustion processes in that cylinder, wherein the value for the valve lift of the valve of the individual cylinder is additionally determined based on the second exhaust gas lambda value.

3. The method of claim 2, wherein the value for the valve lift in the second operating state is greater than the value for the valve lift in the first operating state.

4. The method of claim 2, wherein:

the first operating state of the internal combustion engine is selected such that an error in a fuel supply into the individual cylinder has a smaller influence on the exhaust gas lambda value that is determined on a cylinder-specific basis than an error in a fresh air supply into the individual cylinder, and the second operating state of the internal combustion engine is selected such that an error in the fuel supply into the individual cylinder has a greater influence on the exhaust gas lambda value that is determined on a cylinder-specific basis than an error in the fresh air supply into the individual cylinder.

5. The method of claim 1, wherein the value for the valve lift of the valve of the individual cylinder is determined based on a deviation of the exhaust gas lambda value for fuel combustion in the individual cylinder from a predefined exhaust gas lambda value.

6. The method of claim 5, wherein the determination of the deviation of the exhaust gas lambda value is further based on cylinder-specific errors in the fuel supply.

7. The method of claim 1, wherein the method is performed in response to a determination of predefined conditions regarding stability of at least one of the first operating state and the second operating state.

8. The method of claim 1, further comprising calculating the correction value by forming a ratio between a change in the valve lift and a resulting change in the air mass that is sucked in by all the cylinders of the internal combustion engine in the first operating state.

9. A method for controlling a valve lift of a valve of an individual cylinder of an internal combustion engine with a plurality of cylinders, the method comprising:

determining a value for the valve lift by:

determining a first exhaust gas lambda value for fuel combustion in the individual cylinder in a first operating state of the internal combustion engine, wherein the first exhaust gas lambda value is determined without artificial variation of an air/fuel ratio by cylinder-specific and time-resolved detection of lambda values, wherein for each cylinder, a lambda value is correlated with combustion processes in that cylinder, determining an air mass that is sucked in by all cylinders of the internal combustion engine in the first operating state, and obtaining the value for the valve lift of the valve of the individual cylinder based on the first exhaust gas lambda value, the determined air mass and a correction value, wherein the correction value is based on a relationship between the valve lift and an associated air mass that is sucked in by all the cylinders of the internal combustion engine, and controlling the valve lift based on the determined value for the valve lift.

10. The method of claim 9, wherein a setpoint value for a minimum value for the valve lift is adapted based on the determined value for the valve lift.

11. An internal combustion engine comprising:

a plurality of cylinders each with a valve;

a controller for adjusting a setpoint for a valve lift of each valve; and, a device for determining a value for the valve lift of each valve, the device comprising:

a determining unit configured to determine a first exhaust gas lambda value for fuel combustion in an individual cylinder in a first operating state of the internal combustion engine, wherein the first exhaust gas lambda value is determined without artificial variation of an air/fuel ratio by means of cylinder-specific and time-resolved detection of lambda values, wherein for each cylinder, a lambda value is correlated with combustion processes in that cylinder, and determine an air mass sucked in by all the cylinders of the internal combustion engine in the first operating state, and an evaluation unit configured to determine the value for the valve lift of the valve of the individual cylinder based on the first exhaust gas lambda value, the determined air mass, and a correction value, wherein the correction value is based on a relationship between the valve lift and an associated air mass that is sucked in by all cylinders of the internal combustion engine, and wherein the controller adjusts the setpoint for the valve lift based on the determined value for the valve lift.

12. An engine controller for a vehicle having an internal combustion engine with a plurality of cylinders each having a corresponding valve, the engine controller comprising:

a device configured to determine a value for a valve lift of a valve of an individual cylinder by:

determining a first exhaust gas lambda value for fuel combustion in the individual cylinder in a first operating state of the internal combustion engine, wherein the first exhaust gas lambda value is determined without artificial variation of an air/fuel ratio by cylinder-specific and time-resolved detection of lambda values, wherein for each cylinder, a lambda value is correlated with combustion processes in that cylinder, determining an air mass that is sucked in by all cylinders of the internal combustion engine in the first operating state, and obtaining the value for the valve lift of the valve of the individual cylinder based on the first exhaust gas lambda value, the determined air mass and a correction value, wherein the correction value is based on a relationship between the valve lift and an associated air mass that is sucked in by all the cylinders of the internal combustion engine, and a device configured to adjust a setpoint for the valve lift based on the value obtained for the valve lift.

13. A computer program for controlling an internal combustion engine having a plurality of cylinders each with a corresponding valve, wherein the computer program is stored in non-transitory computer-readable media and executable by a processor to determine a value for a valve lift of a valve of an individual cylinder by:

determining a first exhaust gas lambda value for fuel combustion in the individual cylinder in a first operating state of the internal combustion engine, wherein the first exhaust gas lambda value is determined without artificial variation of an air/fuel ratio by cylinder-specific and time-resolved detection of lambda values, wherein for each cylinder, a lambda value is correlated with combustion processes in that cylinder, determining an air mass that is sucked in by all cylinders of the internal combustion engine in the first operating state, obtaining the value for the valve lift of the valve of the individual cylinder based on the first exhaust gas lambda value, the determined air mass and a correction value, wherein the correction value is based on a relationship between the valve lift and an associated air mass that is sucked in by all the cylinders of the internal combustion engine, and then adjusting a setpoint for the valve lift based on the value obtained for the valve lift.

* * * * *